(No Model.) 2 Sheets—Sheet 1.
S. E. KILDOYLE.
NUT LOCK.
No. 462,643. Patented Nov. 3, 1891.
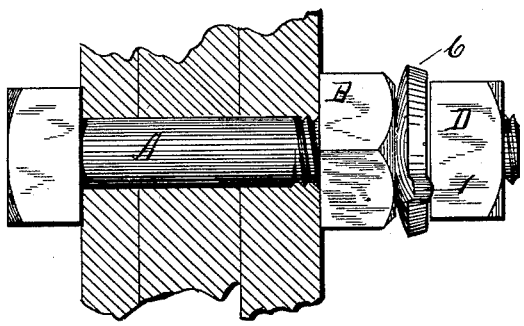
Fig. 1
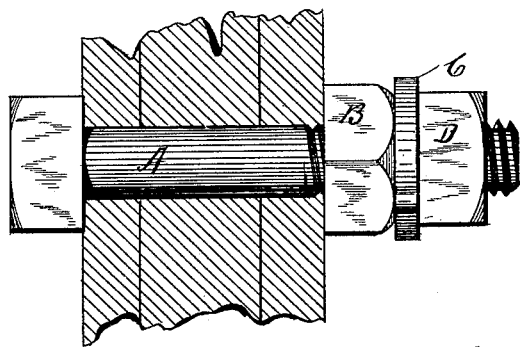
Fig. 2
Fig. 4 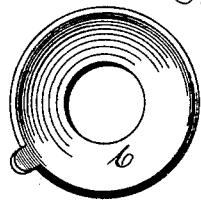 Fig. 5  Fig. 3 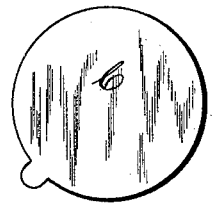
Witnesses
H. A. Carhart,
E. V. Mack.
Storm E. Kildoyle Inventor
By his Attorneys
Smith & Denison (No Model.)  2 Sheets—Sheet 2.
S. E. KILDOYLE.
NUT LOCK.
No. 462,643.  Patented Nov. 3, 1891.
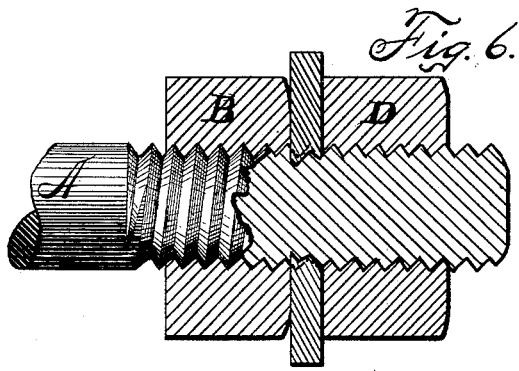
Witnesses
H. A. Carhart.
C. B. Kinne.
Storm E. Kildoyle Inventor
By his Attorneys
Smith & Denison

United States Patent Office.

STORM EDWARD KILDOYLE, OF SYRACUSE, NEW YORK.

NUT-LOCK.

SPECIFICATION forming part of Letters Patent No. 462,643, dated November 3, 1891.

Application filed November 3, 1890. Serial No. 370,219. (No model.)

*To all whom it may concern:*

Be it known that I, STORM EDWARD KILDOYLE, of Syracuse, in the county of Onondaga, in the State of New York, have invented new and useful Improvements in Nut-Locks, of which the following, taken in connection with the accompanying drawings, is a full, clear, and exact description.

My invention relates to nut-locks.

My object is to produce such a locking device by inserting a concaved threaded washer between the main or holding nut and the outer or jam nut.

My invention consists in the several novel features of construction and operation hereinafter described, and specifically set forth in the claim annexed hereto.

It is constructed as follows, reference being had to the accompanying drawings, in which—

Figure 1 is a view of my locking device as it appears when the nuts are only partially screwed up. Fig. 2 is a view of the nuts and washer as they appear when turned up tightly. Fig. 3 is a blank washer. Fig. 4 is a top plan view of a concaved washer complete and ready for use. Fig. 5 is an edge thereof. Fig. 6 is a longitudinal section through the bolt, nuts, and washer, showing the threads of the washer in dotted lines as they appear before being screwed up to form the lock. Fig. 7 is a vertical section through the washer.

Similar letters of reference indicate the corresponding parts.

A is any ordinary bolt, having one end threaded, and B is a main or holding nut.

C is a concaved threaded washer provided on one side with an outward and upwardly extending lug 1.

D is any ordinary jam-nut.

My device is operated as follows: The main nut B is first screwed up tightly against the filler. The washer C is then turned up against it, and the jam-nut D is turned up against it, as shown in Fig. 1. As the jam-nut is then turned its corners engage with the lug 1 upon the washer and force it around and up against the main nut, and by the time the upturned edge of the lug is worn off the washer is screwed tightly against it. The jam-nut then forces the washer out flat, its threads gripping the threads upon the bolt and securely locking it there.

It will be observed that when the jam-nut forces the washer out flat the inner threads of the washer will be forced very tightly about the threads of the bolt. I am aware that concaved washers have heretofore been used in nut-locks, but they have only been used to exert a tension between the ratchet-faces of other bolts to keep them in engagement; but this I do not claim.

What I claim as my invention, and desire to secure by Letters Patent, is—

The combination, with a threaded bolt and the main or holding nut B, of the convexo-concave washer C, provided with the integral outwardly and upwardly extended lug 1, and having its convex side bearing against the outer face of the main or holding nut, and the jam-nut D for wearing off the upturned edge of the lug 1 and forcing the convexo-concave washer flat and causing the threads of said washer to grip the threads upon the bolt and securely lock the washer in place, substantially as specified.

In witness whereof I have hereunto set my hand this 27th day of October, 1890.

STORM EDWARD KILDOYLE.

In presence of—
H. P. DENISON,
E. V. MACK.